(12) United States Patent
Attiwell

(10) Patent No.: US 11,168,823 B2
(45) Date of Patent: Nov. 9, 2021

(54) CONNECTION DEVICE

(71) Applicant: Swick Mining Services Ltd, South Guildford (AU)

(72) Inventor: Paul Attiwell, Mullaloo (AU)

(73) Assignee: Swick Mining Services Ltd, Western (AU)

( * ) Notice: Subject to any disclaimer, the term of this patent is extended or adjusted under 35 U.S.C. 154(b) by 555 days.

(21) Appl. No.: 15/971,773

(22) Filed: May 4, 2018

(65) Prior Publication Data

US 2018/0252052 A1    Sep. 6, 2018

Related U.S. Application Data

(63) Continuation of application No. PCT/AU2016/051081, filed on Nov. 10, 2016.

(30) Foreign Application Priority Data

Nov. 10, 2015   (AU) .................................. 2015904625

(51) Int. Cl.
| | |
|---|---|
| *F16L 37/248* | (2006.01) |
| *F16D 1/112* | (2006.01) |
| *E21B 17/046* | (2006.01) |
| *E21B 17/042* | (2006.01) |
| *F16L 21/08* | (2006.01) |

(52) U.S. Cl.
CPC .......... *F16L 37/248* (2013.01); *E21B 17/042* (2013.01); *E21B 17/046* (2013.01); *F16D 1/112* (2013.01); *F16L 21/08* (2013.01)

(58) Field of Classification Search
CPC .............................. F16L 37/248; F16L 37/107

USPC ........................... 285/360–361, 401–402, 86
See application file for complete search history.

(56) References Cited

U.S. PATENT DOCUMENTS

| | | | | |
|---|---|---|---|---|
| 765,225 | A | * | 7/1904 | Colin ..................... F16L 37/248 285/88 |
| 1,890,011 | A | * | 12/1932 | Wirz ....................... F16L 37/40 285/95 |
| 2,035,887 | A | | 3/1936 | Howard |
| 2,240,738 | A | | 5/1941 | Dunn |

(Continued)

FOREIGN PATENT DOCUMENTS

| | | | | |
|---|---|---|---|---|
| CN | 1417450 | A | | 5/2003 |
| FR | 465921 | A | * | 4/1914 ............ F16L 37/248 |

(Continued)

OTHER PUBLICATIONS

Extended European Search Report dated Jun. 4, 2019 in EP Patent Application No. 16863235.4. 7 pages.

(Continued)

*Primary Examiner* — Zachary T Dragicevich
*Assistant Examiner* — Fannie C Kee
(74) *Attorney, Agent, or Firm* — Kilpatrick Townsend & Stockton LLP

(57) ABSTRACT

A connection device for a core drilling assembly connectible between a head assembly of a core drilling assembly and an inner tube of the core drilling assembly. The connection device has a first connection portion and a second connection portion, and has a connection mechanism arranged to facilitate engagement of the first and second connection portions with each other and disengagement of the first and second connection portions from each other.

7 Claims, 4 Drawing Sheets

(56) References Cited

U.S. PATENT DOCUMENTS

| | | | | |
|---|---|---|---|---|
| 3,217,746 A | * | 11/1965 | Voisine | F16L 37/107 |
| | | | | 137/614.04 |
| 3,253,310 A | * | 5/1966 | McCarthy | F16B 7/22 |
| | | | | 24/607 |
| 4,679,959 A | | 7/1987 | Cavallaro | |
| 5,253,961 A | | 10/1993 | Geissler | |
| 5,607,250 A | | 3/1997 | Tatterson et al. | |
| 6,102,135 A | | 8/2000 | Shaw | |
| 6,106,026 A | | 8/2000 | Smith, III | |

FOREIGN PATENT DOCUMENTS

| | | | | |
|---|---|---|---|---|
| FR | 1526167 A * | 5/1968 | | F16L 37/248 |
| GB | 1194047 A | 6/1970 | | |
| JP | 2004169436 A | 6/2004 | | |
| WO | WO-9722829 A1 * | 6/1997 | | A47L 15/16 |
| WO | WO-2007038222 A2 * | 4/2007 | | B60T 17/043 |

OTHER PUBLICATIONS

International Search Report and Written Opinion dated Nov. 28, 2016 in International Patent Application No. PCT/AU/2016/051081. 8 pages.
International Preliminary Report on Patentability dated Oct. 10, 2017 in International Application No. PCT/AU/2016/051081. 5 pages.
International-Type Search Report and Written Opinion dated Jul. 28, 2016 in National Application No. 2015904625, 8 pages.

* cited by examiner

CONNECTION DEVICE

CROSS-REFERENCES TO RELATED APPLICATIONS

This application is a continuation application of International Patent Application No. PCT/AU2016/051081 entitled "A CONNECTION DEVICE," filed on Nov. 10, 2016, which claims priority to Australian Patent Application No. 2015904625, filed on Nov. 10, 2015, which are herein incorporated by reference in their entirety for all purposes.

FIELD OF THE INVENTION

The present invention relates to a connection device for a core drilling assembly.

BACKGROUND OF THE INVENTION

During a core drilling operation, a core drilling assembly is used to obtain a core sample. The core sample is created when an annular drill bit and associated drill string drills through ground, and an inner tube assembly is typically used to retain the core sample as drilling progresses. The inner tube assembly locates within a core barrel assembly and typically includes an inner tube connected using a screw thread to a head assembly that facilitates retrieval of the inner tube assembly from the drill string when a suitable core sample is disposed in the inner tube assembly.

However, the inner tube assembly can be relatively long and as a consequence when the inner tube assembly is retrieved from the core barrel assembly the inner tube assembly can be cumbersome and difficult for operators to handle. In particular, because of the combined length of the head assembly and inner tube, it can be difficult for operators to unscrew the head assembly from the inner tube.

BRIEF SUMMARY OF THE INVENTION

In accordance with a first aspect of the present invention, there is provided a connection device for a core drilling assembly, the connection device comprising:

a first connection portion and a second connection portion;

the connection device including a connection mechanism arranged to facilitate engagement of the first and second connection portions with each other and disengagement of the first and second connection portions from each other;

the connection mechanism including:

at least one locking projection disposed on the first connection portion and at least one corresponding locking path disposed on the second connection portion, the locking path having a locking position such that the first and second connection portions are held together when a locking projection is disposed in the locking position, wherein each locking projection is engageable with a respective locking path, and the locking path is arranged such that the locking projection is movable through the locking path and receivable in the locking position by moving the first and second connection portions substantially towards each other and rotating the first and second connection portions relative to each other; and a locking collar mounted on the first connection portion such that the locking collar is reciprocably movable relative to the at least one locking projection and rotation of the locking collar relative to the at least one locking projection is restricted, the locking collar including a locking tab;

wherein when the locking projection is disposed in the locking position, the locking collar is reciprocably movable between:

a first position wherein the locking tab engages with the locking path so as to restrain the first and second connection portions from rotating relative to each other and thereby restrain the projection from moving along at least a portion of the locking path, and a second position wherein the locking tab does not engage with the locking path and does not restrain the first and second connection portions from rotating relative to each other, thereby permitting the projection to move along the locking path; and wherein the locking collar is resiliently biased towards the first position such that the locking collar resiliently urges the first and second connection portions away from each other.

In an embodiment, the locking path is generally L-shaped and includes a longitudinal path portion extending in a direction substantially parallel to the connection device and a transverse path portion extending in a direction generally transverse of the connection device.

In an embodiment, the locking position is defined by a well portion integral with the transverse path portion.

In an embodiment, the connection device comprises a first biasing member arranged to resiliently bias the first and second connection portions away from each other and thereby the projection towards the locking position.

In an embodiment, the locking member comprises an elongate guide aperture and the first connection portion includes a guide pin received in the elongate guide aperture, the guide pin and the guide aperture cooperating so as to facilitate reciprocal movement of the locking member relative to the first connection portion and to restrict rotation of the locking member relative to the first connection portion.

In an embodiment, the second connection portion includes a guide projection arranged to facilitate alignment of the first and second connection portions as the first and second connection portions are moved towards each other during engagement of the first connection portion with the second connection portion.

In an embodiment, the guide projection includes a through hole arranged to facilitate passage of fluid through the connection device when the connection device is connected to the head assembly and the inner tube during use.

BRIEF DESCRIPTION OF THE DRAWINGS

Embodiments of the present invention will now be described, by way of example only, with reference to the accompanying figures, in which.

DETAILED DESCRIPTION OF THE INVENTION

Figure 1:
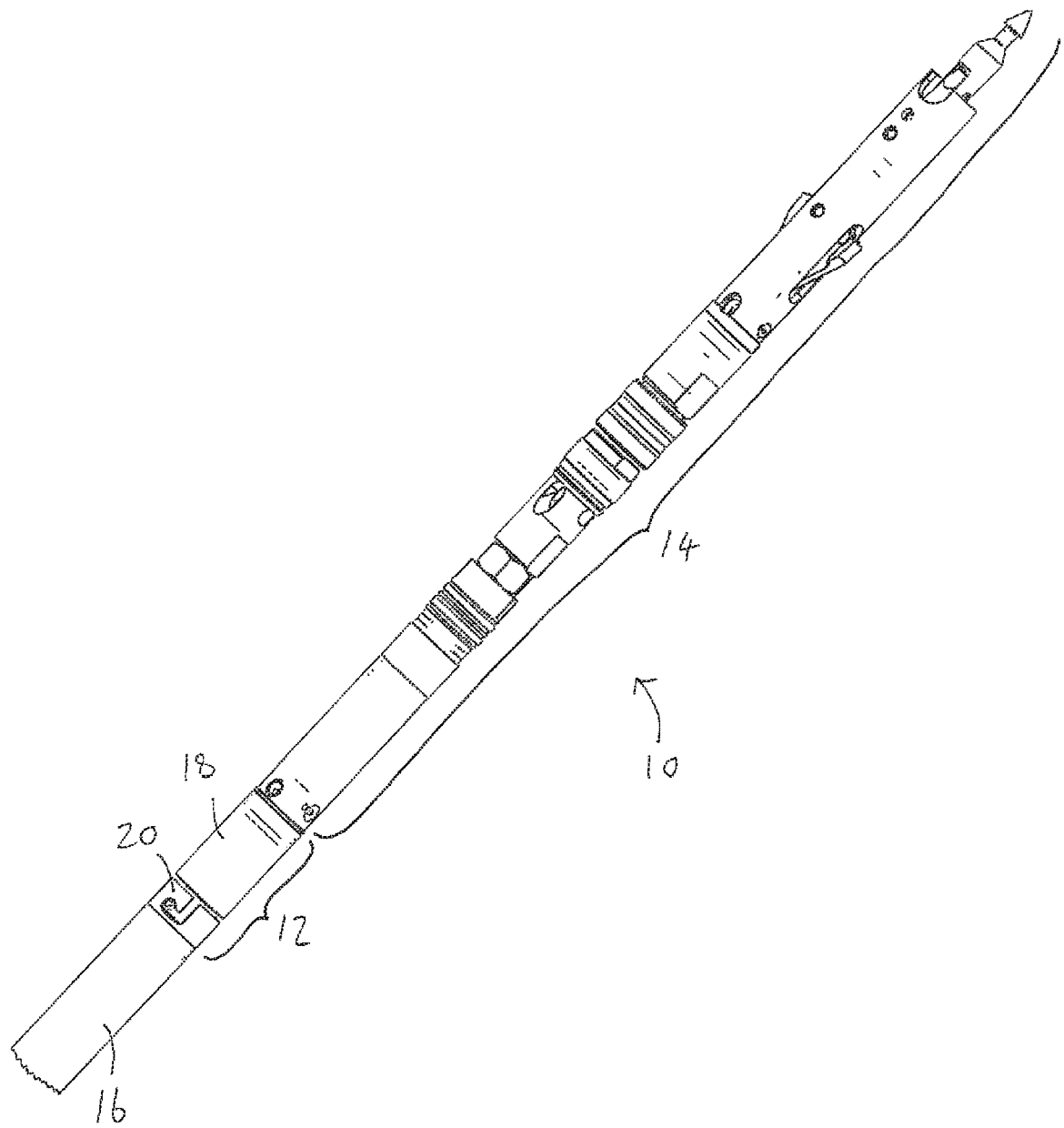
FIG. 1 is a diagrammatic side view of an inner tube assembly including a connection device in accordance with an embodiment of the present invention.

Referring to FIG. 1, an inner tube assembly 10 of a core drilling assembly is shown, the inner tube assembly 10 including a connection device 12 disposed between a head assembly 14 and an inner tube 16.

The head assembly 14 is usable to retrieve the inner tube assembly 10 from a core barrel assembly (not shown) of a core drilling assembly (not shown).

The inner tube 16 receives and retains a core sample as drilling progresses and is retrieved from the core barrel assembly when the inner tube 16 is full by retrieving the head assembly 14 from the core barrel assembly.

Figure 2:
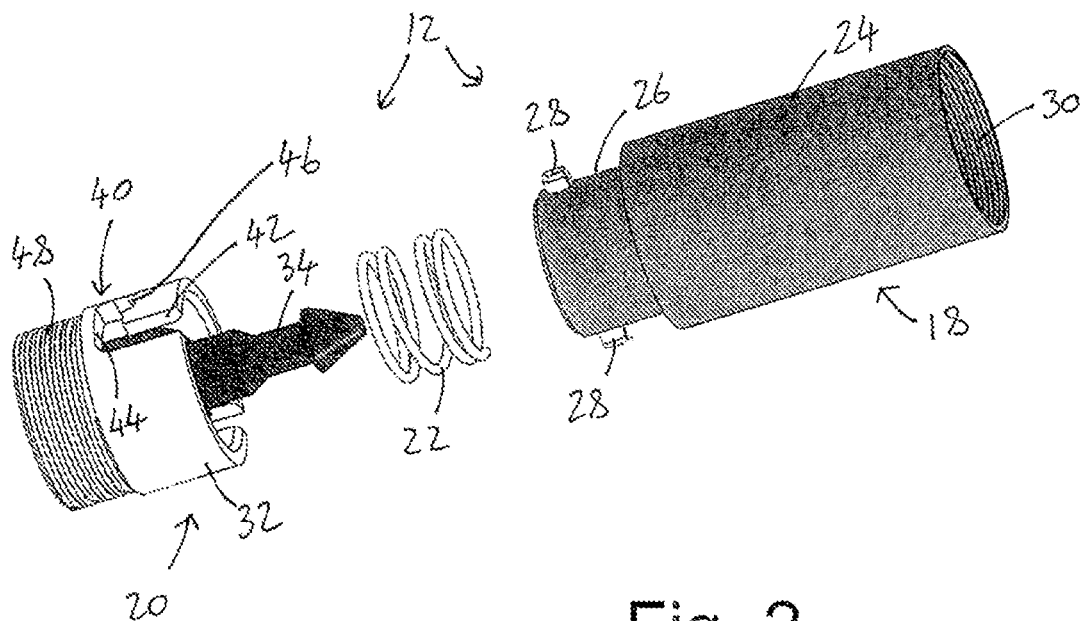
FIG. 2 is an exploded view of the connection device shown in FIG. 1.
Figure 3:
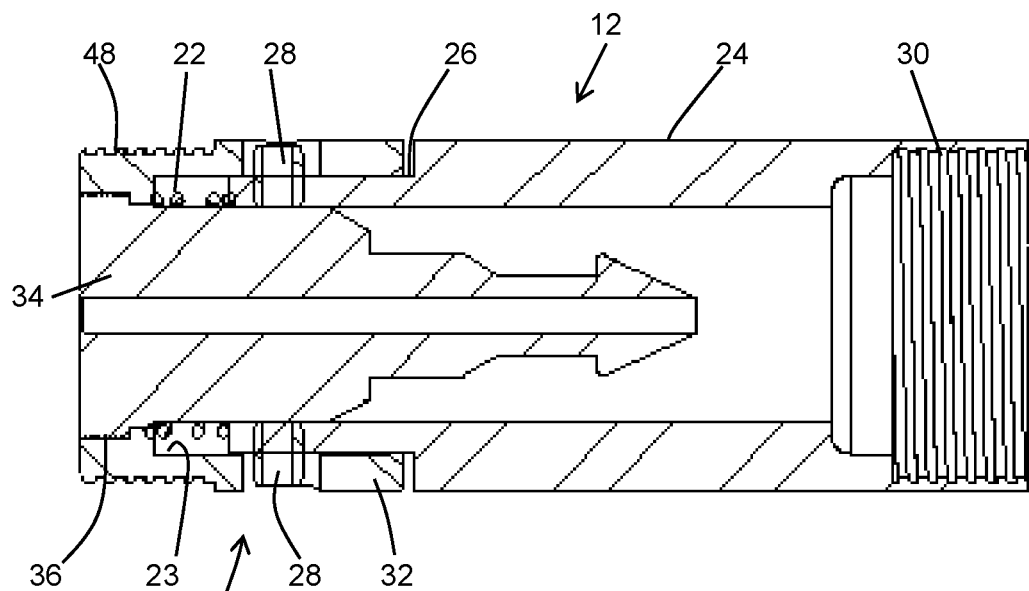
FIG. 3 is a cross sectional view of the connection device shown in FIG. 2 with the connection device shown in a connected configuration.

As shown more particularly in FIGS. 2 and 3, the connection device 12 includes a first connection portion 18 and a second connection portion 20 that are arranged to connect together and disconnect from each other in a quick-release manner. Disposed between the first and second connection portions 18, 20 in an annular cavity 23 defined by the second connection portion 20 is a biasing member, in this example a coil spring 22, arranged to resiliently bias the first and second connection portions 18, 20 away from each other.

The first connection portion 18 includes a first cylindrical portion 24 and an integral second cylindrical portion 26 of smaller diameter than the first cylindrical portion 24. Disposed on the second cylindrical portion 26 and extending outwardly is at least one locking projection 28, in this example two oppositely disposed locking projections 28, usable to lock the first and second connection portions 18, 20 together as described in more detail below.

The first connection portion 18 also includes an internal screw threaded portion 30 that engages during use with a corresponding external screw threaded portion of the head assembly 14 in order to connect the first connection portion 18 to the head assembly 14.

The second connection portion 20 includes an outer socket portion 32 and an inner socket portion 34 that in the present example connect together using complementary screw threaded portions 36. The outer and inner socket portions 32, 34 together define the annular cavity 23 that receives the coil spring 22.

The outer socket portion 32 also includes a locking path 40 of generally L-shape configuration, the locking path including a longitudinal path portion 42, a transverse path portion 44 perpendicularly disposed relative to the longitudinal path portion 42 and a well portion 46 disposed at a remote end of the transverse path portion 44. Each locking projection has an associated locking path 40 and the arrangement is such that each locking path 40 is configured to receive a locking projection 28, and by manipulating the first and second connection portions 18, 20 a user is able to move the locking projections 28 in the respective locking paths 40 until the locking projections 28 are seated in the respective locking wells 46.

It will be understood that by virtue of the resilient biasing force provided by the coil spring 22, the locking projections 28 will be urged to remain seated in the respective locking wells 46, and thereby the first and second connection portions are urged to remain connected together, until a user applies a force against the biasing force of the coil spring 22. In this way, the locking wells 46 correspond to locking positions such that the first and second connection portions 18, 20 securely connect together when the locking projections 28 are disposed in the locking positions.

The outer socket portion 32 also includes an external screw threaded portion 48 that engages during use with a corresponding internal screw threaded portion of the inner tube 16 in order to connect the second connection portion 20 to the inner tube 16.

The inner socket portion 34 includes a guide projection 50 arranged to facilitate correct alignment of the first and second connection portions 18, 20 as the first and second connection portions 18, 20 are connected together. The guide projection 50 includes a through hole 52 that facilitates passage of fluid through the connection device 10 when the connection device 10 is connected to the head assembly 14 and the inner tube 16 during use.

Figure 4A:
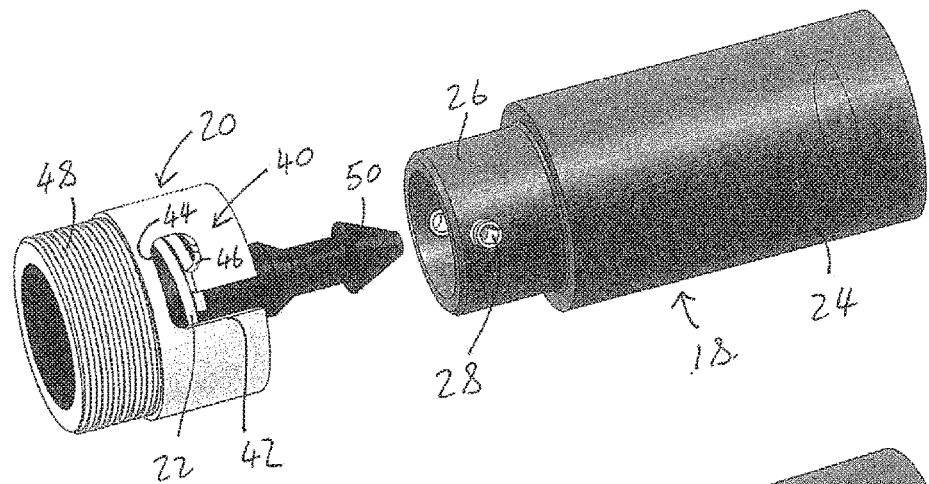
FIGS. 4A to 4C are diagrammatic perspective views of the connection device shown in FIG. 2 with the connection device shown at 3 positions between a disconnected configuration and a connected configuration.
Figure 4B:
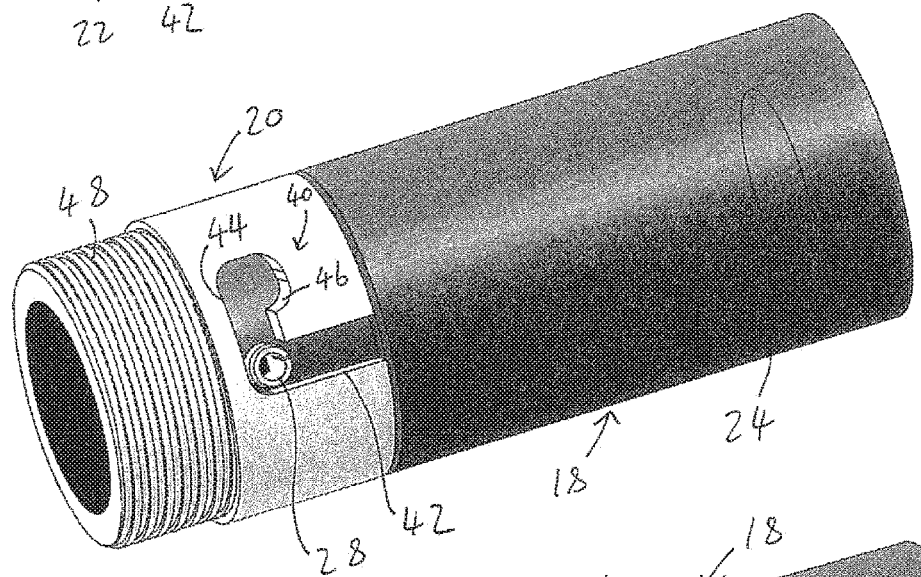
Figure 4C:
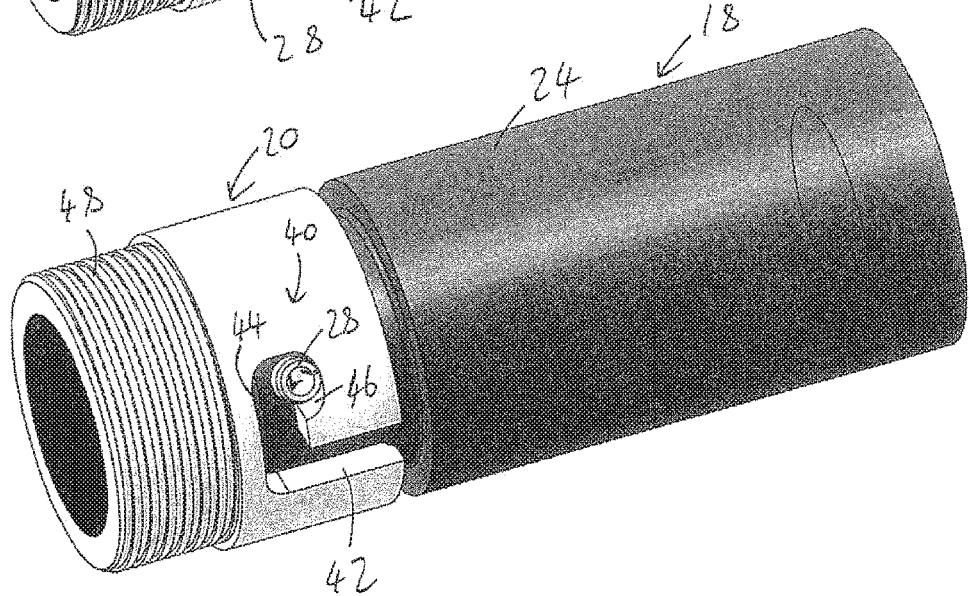

A process of connecting the first and second connection portions 18, 20 together and disconnecting first and second connection portions 18, 20 from each other is shown in FIG. 4.

The first connection portion 18 is connected to a head assembly 14 using the internal screw threaded portion 30 and the second connection portion 20 is connected to an inner tube 16 using the external screw threaded portion 48.

As shown in FIG. 4A, in order to connect the first and second connection portions 18, 20 together the first and second connection portions 18, 20 are first aligned such that the guide projection 50 aligns with the second cylindrical portion 26 and the locking projections 28 align with the longitudinal path portions 42. As shown in FIG. 4B, the first and second connection portions 18, 20 are then urged towards each other against the biasing force of the coil spring 22 with the locking projections 28 moving through the longitudinal path portions 42. When the locking projections 28 reach the end of the longitudinal path portions 42, the user rotates the first and second connection portions 18, 20 relative to each other so that the locking projections 28 move through the transverse path portions 44. When the locking projections 28 reach the end of the transverse path portions 44, the user releases the first and/or second connection portion 18, 20 which causes the coil spring 22 to urge the locking projections 28 to seat in the well portions 46.

Disengagement of the first and second connection portions 18, 20 from each other is achieved by reversing the connection steps.

It will be understood that in this way, a quick connection and release mechanism is provided that allows an operator to quickly engage the head assembly 14 with the inner tube 16, and in particular quickly disengage the head assembly 14 from the inner tube 16 as the inner tube assembly 10 is retrieved from a core barrel assembly.

During use, it is possible that the first and second connection portions 18, 20 may inadvertently disengage from each other as a consequence of reciprocal and rotational movement of the head assembly 14 and the inner tube 16. In order to prevent such disengagement, a locking arrangement is provided for restraining rotation of the first and second connection portions 18, 20 relative to each other, thereby preventing the locking projections 28 from moving through the transverse path portions 44 and preventing disengagement of the first connection portion 18 from the second connection portion 20.

Figure 5:
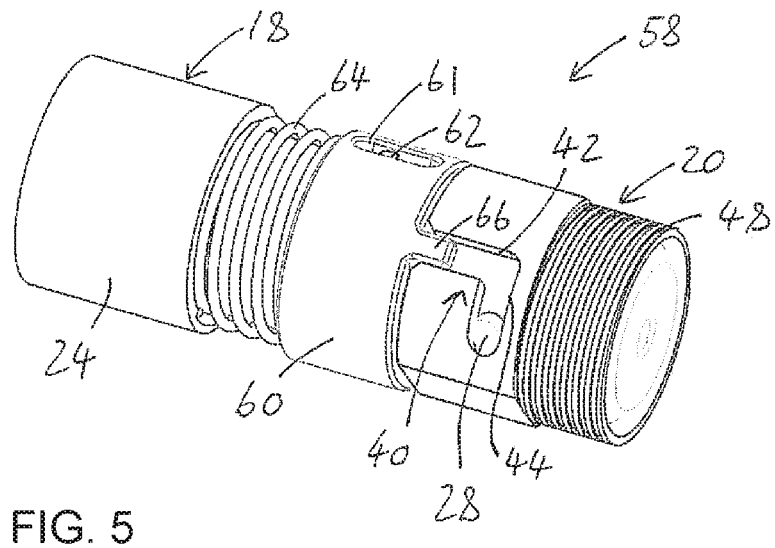
FIG. 5 is a diagrammatic perspective view of a connection device including a locking arrangement.
Figure 6:
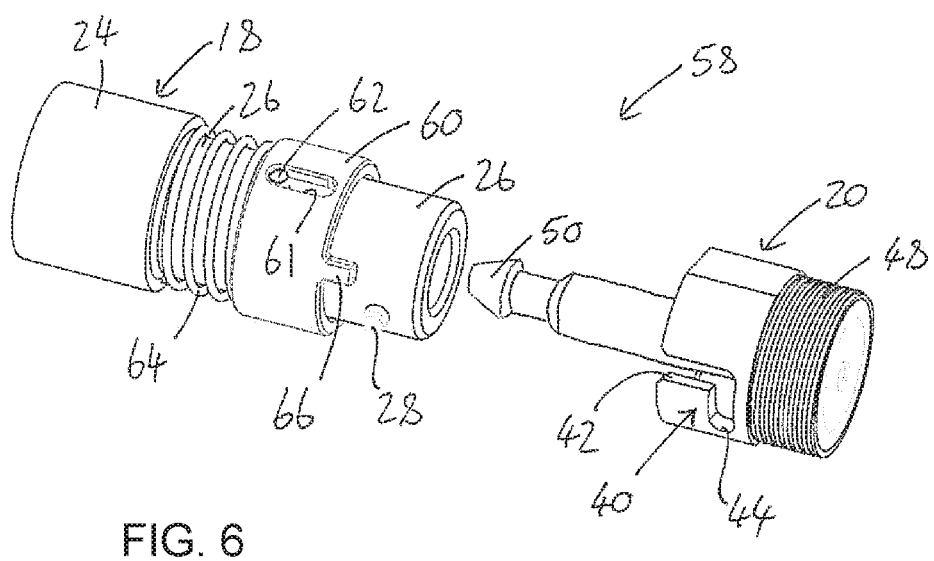
FIG. 6 is a diagrammatic exploded perspective view of the connection device shown in FIG. 5.

Referring to FIGS. 5 and 6, a connection device 58 is shown that includes a suitable locking arrangement. Like and similar features are shown with like reference numerals.

The connection device 58 includes a locking member 60, in this example a locking collar, mounted on the second cylindrical portion 26 of the first connection portion 18 and reciprocably movable relative to the second cylindrical portion 26. The locking member 60 includes an elongate guide aperture 61 that receives a guide pin 62 disposed on the second cylindrical portion 26. The guide aperture 61 and guide pin 62 cooperate to enable the locking collar to move reciprocably relative to the second cylindrical portion 26 whilst restraining rotation of the locking collar 60 relative to the second cylindrical portion 26.

The locking member 60 is configured so as to engage with the second connection portion 20 so as to restrict rotation of the second connection portion 20 relative to the locking member 60 and thereby restrict rotation of the first and second connection portions 18, 20 relative to each other.

In this example, relative rotation between the second connection portion 20 and the locking member 60 is restricted by providing the locking member 60 with a locking tab 66 disposed at a location such that the locking tab 66 is received in the longitudinal path portion 42 when the locking projection 28 is disposed in the locking position, as shown in FIG. 5. In this way, relative rotation between the second connection portion 20 and the locking member 60 is restricted by engagement between the locking tab 66 and the longitudinal path portion 42.

The locking member 60 is movable between a first position wherein coil spring 64 is compressed, and during use the locking tab 66 is not engaged with the longitudinal path portion 42, and a second position wherein the coil spring is expanded, and during use the locking tab 66 is engaged with the longitudinal path portion 42. The locking member 60 is biased towards the second position, in this example using a coil spring 64.

During use, in order to connect the first and second connection portions 18, 20 together, the first and second connection portions 18, 20 are first aligned such that the guide projection 50 aligns with the second cylindrical portion 26 and the locking projections 28 align with the longitudinal path portions 42. The first and second connection portions 18, 20 are then urged towards each other with the locking projections 28 moving through the longitudinal path portions 42. This causes the locking tab 66 to contact the second connection portion 20, and the locking member 60 to move from the second position towards the first position against the biasing force of the coil spring 64. When the locking projections 28 reach the end of the longitudinal path portions 42, the user rotates the first and second connection portions 18, 20 relative to each other so that the locking projections 28 move through the transverse path portions 44. Rotation of the first and second connection portions 18, 20 relative to each other causes the second connection portion 20 to rotate relative to the locking member 60, and relative rotation continues until the locking tab 66 is aligned with the longitudinal path portion 42. When this occurs, the user allows the biasing force of the coil spring 64 to act on the locking member 60 to cause the locking tab 66 to be received in the longitudinal path portion 42, as shown in FIG. 5.

Disengagement of the first and second connection portions 18, 20 from each other is achieved by first urging the locking member 60 to move away from the locking projections 28 against the biasing force of the coil spring 64 until the locking tab 66 is released from the longitudinal path portion 42. This allows the first and second connection portions 18, 20 to be rotated relative to each other and movement of the locking projection in the transverse path portion 44 to occur.

While the above embodiments are described in relation to a connection device 12 that has a first connection portion 18 connected to a head assembly 14 and a second connection portion 20 connected to an inner tube 16, it will be understood that an alternative arrangement is envisaged wherein the first connection portion 18 is connected to the inner tube 16 and the second connection portion 20 is connected to the head assembly 14.

In the description of the invention, except where the context requires otherwise due to express language or necessary implication, the words "comprise" or variations such as "comprises" or "comprising" are used in an inclusive sense, i.e. to specify the presence of the stated features, but not to preclude the presence or addition of further features in various embodiments of the invention.

Modifications and variations as would be apparent to a skilled addressee are deemed to be within the scope of the present invention.

What is claimed is:

1. A connection device for a core drilling assembly, the connection device comprising:
   a first connection portion and a second connection portion;
   the connection device including a connection mechanism arranged to facilitate engagement of the first and second connection portions with each other and disengagement of the first and second connection portions from each other;
   the connection mechanism including:
      at least one locking projection disposed on the first connection portion and at least one corresponding locking path disposed on the second connection portion, the locking path having a locking position such that the first and second connection portions are held together when the at least one locking projection is disposed in the locking position, wherein each locking projection of the at least one locking projection is engageable with a respective locking path, and the locking path is arranged such that the at least one locking projection is movable through the locking path and receivable in the locking position by moving the first and second connection portions substantially towards each other and rotating the first and second connection portions relative to each other; and
      a locking collar mounted on the first connection portion such that the locking collar is reciprocably movable relative to the at least one locking projection and rotation of the locking collar relative to the at least one locking projection is restricted, the locking collar including a locking tab;
   wherein when the at least one locking projection is disposed in the locking position, the locking collar is reciprocably movable between:
      a first position wherein the locking tab engages with the locking path so as to restrain the first and second connection portions from rotating relative to each other and thereby restrain the at least one locking projection from moving along at least a portion of the locking path, and
      a second position wherein the locking tab does not engage with the locking path and does not restrain the first and second connection portions from rotating relative to each other, thereby permitting the at least one locking projection to move along the locking path; and wherein the locking collar is resiliently biased towards the first position such that the locking collar resiliently urges the first and second connection portions away from each other.

2. A connection device as claimed in claim 1, wherein the locking path is generally L-shaped and includes a longitudinal path portion extending in a direction substantially parallel to the connection device and a transverse path portion extending in a direction generally transverse of the connection device.

3. A connection device as claimed in claim 2, wherein the locking position is defined by a well portion integral with the transverse path portion.

4. A connection device as claimed in claim 1, comprising a first biasing member arranged to resiliently bias the first and second connection portions away from each other and thereby the at least one locking projection towards the locking position.

5. A connection device as claimed in claim 1, wherein the locking collar comprises an elongate guide aperture and the first connection portion includes a guide pin received in the elongate guide aperture, the guide pin and the elongate guide aperture cooperating so as to facilitate reciprocal movement of the locking collar relative to the first connection portion and to restrict rotation of the locking collar relative to the first connection portion.

6. A connection device as claimed in claim 1, wherein the second connection portion includes a guide projection arranged to facilitate alignment of the first and second connection portions as the first and second connection portions are moved towards each other during engagement of the first connection portion with the second connection portion.

7. A connection device as claimed in claim 6, wherein the guide projection includes a through hole arranged to facilitate passage of fluid through the connection device when the connection device is connected to a head assembly and to an inner tube during use.

\* \* \* \* \*